(12) United States Patent
O'Farrell et al.

(10) Patent No.: US 12,405,101 B2
(45) Date of Patent: Sep. 2, 2025

(54) HYBRID WIRE LOCALIZATION LENGTH MEASUREMENT DEVICE

(71) Applicant: Microsoft Technology Licensing, LLC, Redmond, WA (US)

(72) Inventors: Eoin Conor O'Farrell, Frederiksberg (DK); Roland Zeisel, Copenhagen (DK); Roman Mykolayovych Lutchyn, Santa Barbara, CA (US); Tom Marijn Laeven, Delft (NL); Kevin Alexander Van Hoogdalem, Alphen aan den Rijn (NL); Naganivetha Thiyagarajah, Copenhagen (DK); Andrey Antipov, Santa Barbara, CA (US); William Scott Cole, Jr., Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 186 days.

(21) Appl. No.: 18/322,189

(22) Filed: May 23, 2023

(65) Prior Publication Data
US 2024/0295393 A1   Sep. 5, 2024

Related U.S. Application Data

(60) Provisional application No. 63/488,150, filed on Mar. 2, 2023.

(51) Int. Cl.
*G01B 7/02*   (2006.01)
*G06N 10/40*   (2022.01)
(52) U.S. Cl.
CPC ............... *G01B 7/02* (2013.01); *G06N 10/40* (2022.01)

(58) Field of Classification Search
CPC .................................. G01B 7/02; G01N 10/40
See application file for complete search history.

(56) References Cited

FOREIGN PATENT DOCUMENTS

WO   WO-2022152373 A1 * 7/2022 ......... G01R 19/0092

OTHER PUBLICATIONS

International Search Report and Written Opinion received for PCT Application No. PCT/US2024/18194, Jun. 11, 2024, 13 pages.
Jack, et al., "Detecting and distinguishing Majorana zero modes with the scanning tunnelling microscope", Nature Reviews Physics, vol. 3, Issue 8, Aug. 1, 2021, pp. 541-554.
Poschl, "Nonlocal transport signatures of Andreev bound states", In Repository of arXiv:2212.12068v1, 2022, 157 Pages.
Razmadze, et al., "Quantum Dot Parity Effects in Trivial and Topological Josephson Junctions", Physical Review Letters, vol. 125, Issue 11, Sep. 8, 2020, 6 Pages.
Vaitiekenas, et al., "Flux-induced topological superconductivity in full-shell nanowires", Science, vol. 367, Issue 6485, Mar. 27, 2020, pp. 1-9.

* cited by examiner

*Primary Examiner* — Minh Q Phan
(74) *Attorney, Agent, or Firm* — Alleman Hall & Tuttle LLP

(57) ABSTRACT

A superconductor-semiconductor device is provided, including a hybrid superconductor-semiconductor wire. The superconductor-semiconductor device may further include a hybrid localization length (LL) measurement device including a plurality of contact gates located above the hybrid superconductor-semiconductor wire in a thickness direction. The hybrid LL measurement device may further include a conductance sensor electrically coupled to the plurality of contact gates.

20 Claims, 14 Drawing Sheets

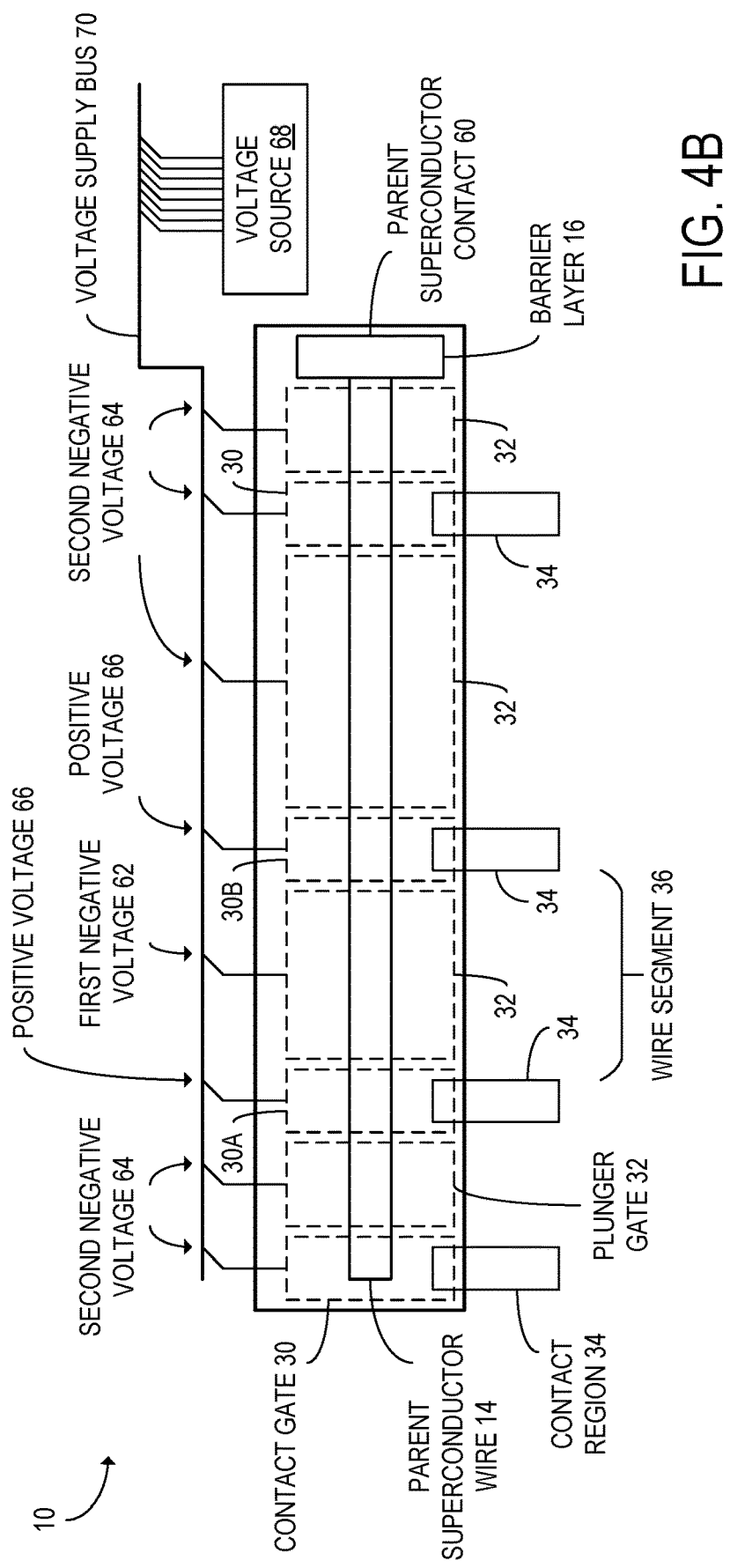

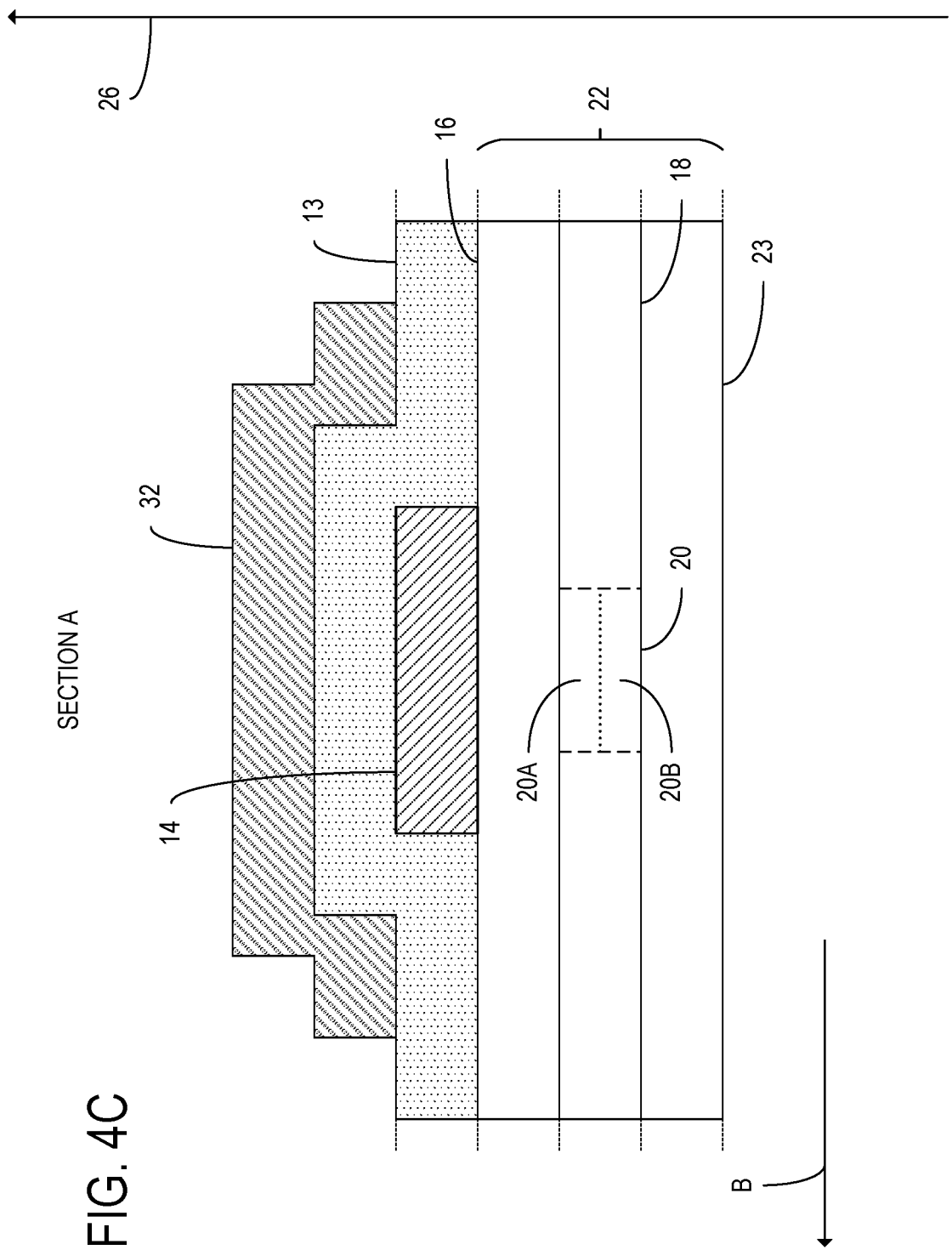

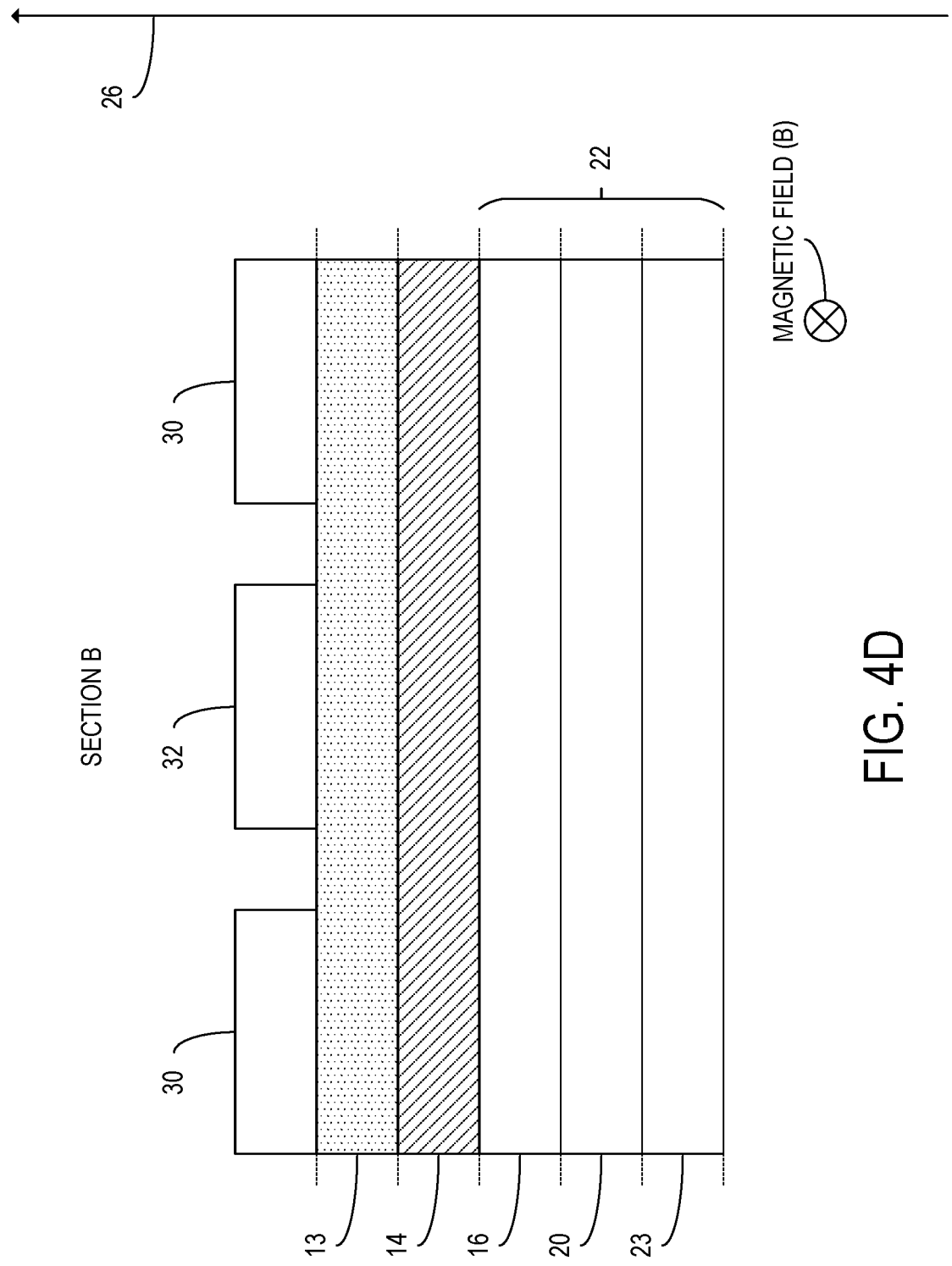

HYBRID WIRE LOCALIZATION LENGTH MEASUREMENT DEVICE

CROSS REFERENCE TO RELATED APPLICATIONS

This application claims priority to U.S. Provisional Patent Application Ser. No. 63/488,150, filed Mar. 2, 2023, the entirety of which is hereby incorporated herein by reference for all purposes.

BACKGROUND

The Localization Length (LL) is the length scale that characterizes disorder strength in a low-dimensional (e.g., approximately one-dimensional) device when charge carriers such as electrons flow through the device. The LL therefore determines how conductance is reduced as the material sample size is increased and is a statistical measure of disorder that is used to characterize material systems and processing methods. In an approximately one-dimensional semiconductor wire, the LL defines how far charge carriers travel in a material before a scattering event.

SUMMARY

According to one aspect of the present disclosure, a superconductor-semiconductor device is provided, including a hybrid superconductor-semiconductor wire. The superconductor-semiconductor device further includes a hybrid localization length (LL) measurement device including a plurality of contact gates located above the hybrid superconductor-semiconductor wire in a thickness direction. The hybrid LL measurement device further includes a conductance sensor electrically coupled to the plurality of contact gates.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 4B shows the example top view of the superconductor-semiconductor device when voltages are applied to the plunger gates and the contact gates, according to the example of FIG. 4A.

FIGS. 4C-4E show example cross-sections of the superconductor-semiconductor device, according to the example of FIG. 4A.

DETAILED DESCRIPTION

The LL is a quantity that is relevant to the functioning of topological quantum computing devices. Topological quantum computing devices use Majorana zero modes (MZMs) formed at boundaries between semiconducting and superconducting wires to form qubits. Under conditions in which the LL is much shorter than the length of the semiconducting wire, an MZM does not form at the boundary between the semiconducting wire and the superconducting wire. MZM formation requires the LL within the semiconducting wire to be greater than the topological coherence length of the semiconductor. In addition, increasing the LL of the semiconductor leads to a reduction in the topological coherence length, and a shorter topological coherence length may allow for smaller device sizes. Thus, measurements of the LL may be used to assess the performance of a topological quantum computing device. For example, the LL of the semiconducting wire may be measured during the process of developing the quantum computing device. LL measurement may also be performed as a quality control test during quantum computing device manufacturing.

For an electrically conducting wire in the localized regime, conductance scales with the wire length L and the LL $\xi$ according to $\exp(-L/\xi)$. This scaling may be used to experimentally extract the LL by measuring the conductance in a series of wires with varying lengths, as discussed in further detail below. Exponential curve-fitting may then be used to estimate the LL.

Figure 1:
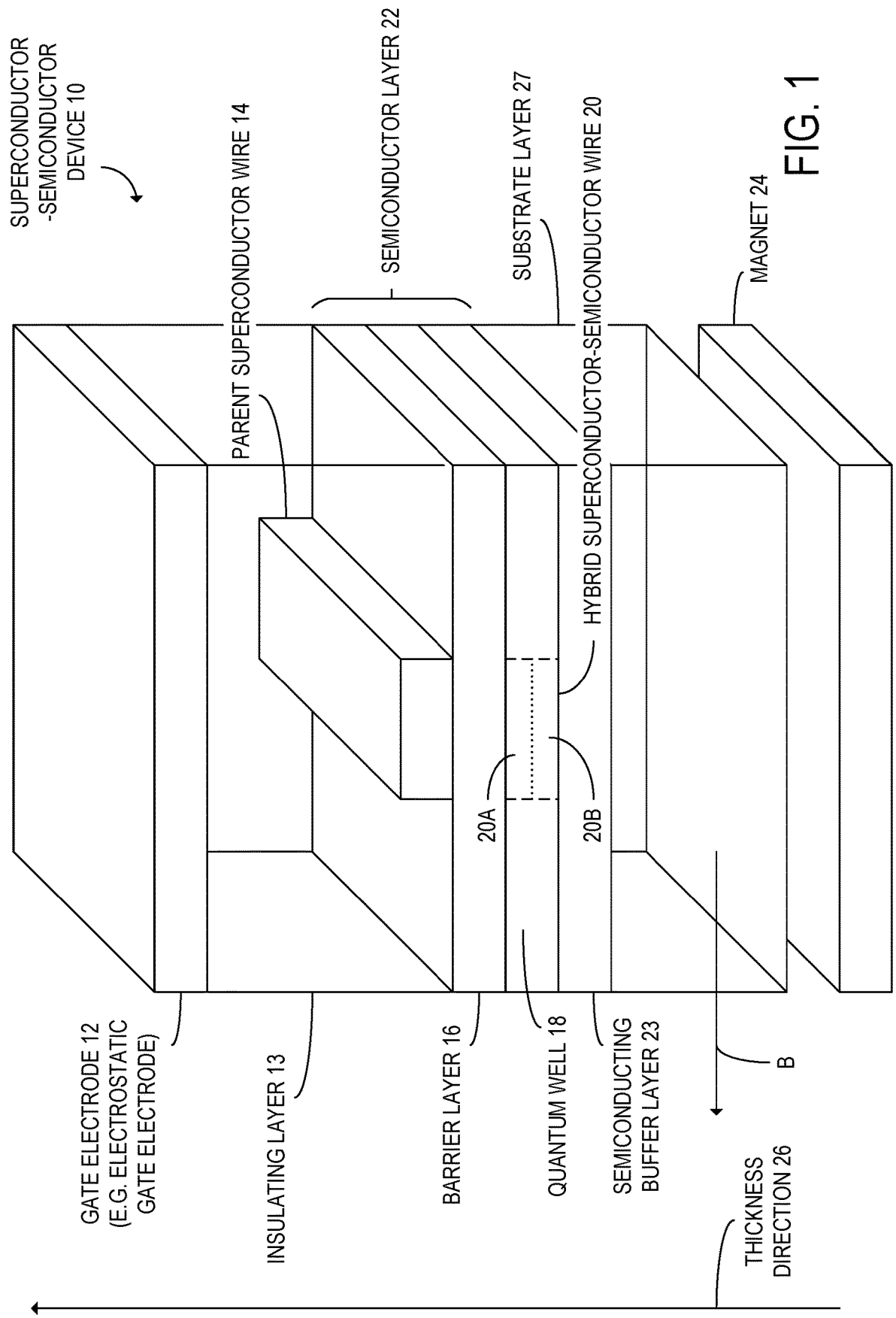
FIG. 1 schematically shows components of a superconductor-semiconductor device at which LL measurement may be performed, according to one example embodiment.

FIG. 1 schematically shows components of an example superconductor-semiconductor device 10 at which LL measurement may be performed. At the superconductor-semiconductor device 10 depicted in FIG. 1, a hybrid superconductor-semiconductor wire 20 is provided in a quantum well 18. The quantum well 18 is located in a semiconductor layer 22 of the superconductor-semiconductor device 10. The hybrid superconductor-semiconductor wire 20 may be formed by electrostatically confining the hybrid superconductor-semiconductor wire 20 wire in a two-dimensional electron gas (2DEG) that forms in the quantum well 18. This electrostatic confinement produces a superconducting wire 20A and a semiconducting wire 20B arranged adjacent to and in parallel to each other to thereby form the hybrid superconductor-semiconductor wire 20. The semiconductor layer 22 within which the quantum well 18 forms may, for example, be an indium arsenide (InAs) layer, and may be grown via molecular beam epitaxy.

The superconductor-semiconductor device 10 depicted in FIG. 1 further includes a parent superconductor wire 14 located above and parallel to the hybrid superconductor-semiconductor wire 20 in the thickness direction 26. The parent superconductor wire 14 may have a width of order 100 nm and a length of several microns. The parent superconductor wire 14 may, for example, be formed from aluminum or lead.

The superconductor-semiconductor device 10 further includes a barrier layer 16 located between the parent superconductor wire 14 and the quantum well 18 in the thickness direction 26. The barrier layer 16 may be included in the semiconductor layer. Accordingly, the barrier layer 16 acts as an energy barrier that separates the 2DEG formed in the quantum well 18 from the parent superconductor wire 14. The barrier layer 16 may, for example, be an indium aluminum arsenide (InAlAs) layer.

As depicted in the example of FIG. 1, the superconductor-semiconductor device 10 may further include a magnet 24 configured to produce an in-plane magnetic field B perpendicular to an axis of the hybrid superconductor-semiconductor wire 20. Accordingly, the direction of the in-plane magnetic field B may be in the plane of the semiconductor layer 22 but perpendicular to a length direction of the hybrid superconductor-semiconductor wire 20 and the parent superconductor wire 14. The strength of the in-plane magnetic field B may, for example, be approximately 1 T.

FIG. 1 further shows a semiconducting buffer layer 23 located below the quantum well 18 in the thickness direction 26. The semiconducting buffer layer 23 may be included in the semiconductor layer 22. In addition, FIG. 1 shows a substrate layer 27 located below the semiconducting buffer layer 23. The semiconducting buffer layer 23 and the substrate layer 27 may be located between the quantum well 18 and the magnet 24. The magnet 24 may be spaced apart from the substrate layer 27, as shown in FIG. 1. In other examples, the magnet 24 may be located at some other position, such as on a horizontal side of the superconductor-semiconductor device 10.

FIG. 1 further shows a gate electrode 12 located above the parent superconductor wire 14. The gate electrode 12 may, for example, be an electrostatic gate electrode. Via the gate electrode 12, a voltage may be applied to the quantum well 18 to form the superconductor-semiconductor hybrid wire 20. Applying the voltage to the gate electrode 12 may charge carriers in exposed semiconductor regions, which, in the example of FIG. 1, are the regions of the quantum well 18 that are not underneath the parent superconductor wire 14. The gate electrode 12 may be separated from the barrier layer 16 by an insulating layer 13.

Figure 2:
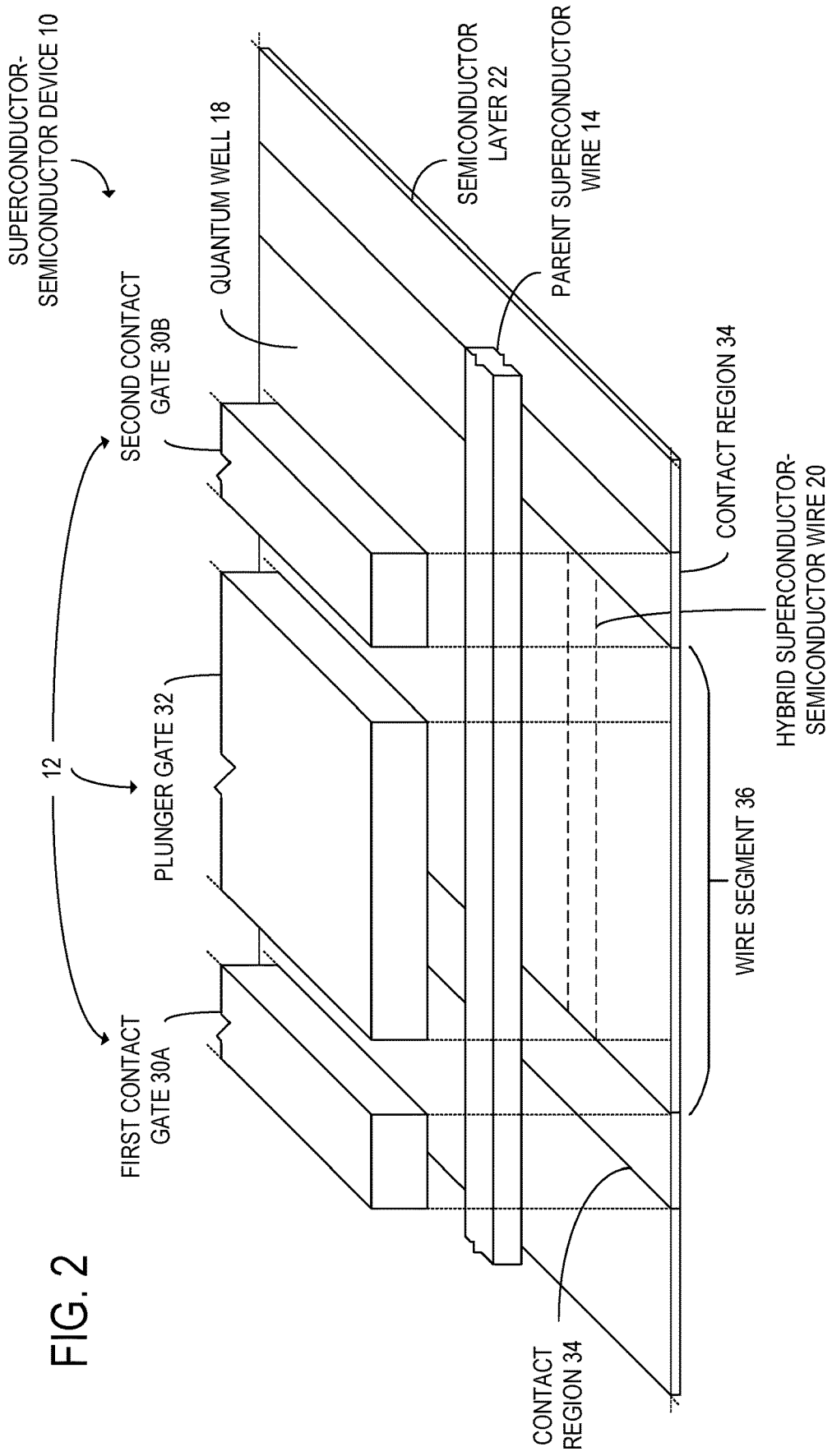
FIG. 2 schematically shows the superconductor-semiconductor device, including a plurality of gate electrodes, according to the example of FIG. 1.

As depicted in the example of FIG. 2, the superconductor-semiconductor device 10 may include a plurality of gate electrodes 12 located above the parent superconductor wire 14 in the thickness direction 26. FIG. 2 schematically shows the superconductor-semiconductor device 10 when the hybrid superconductor-semiconductor wire 20 forms at the quantum well 18. The plurality of gate electrodes 12 shown in the example of FIG. 2 include a first contact gate 30A, a second contact gate 30B, and a plunger gate 32 located between the first contact gate 30A and the second contact gate 30B. The plurality of gate electrodes 12 may alternate between contact gates 30 and plunger gates 32 located along the axis of the hybrid superconductor-semiconductor wire 20.

In examples in which the semiconductor layer 22 is formed from an electron-like semiconductor, the plunger gate 32 may be set to a negative voltage relative to the semiconductor layer 22. The negative voltage applied in such examples depletes charge carriers in regions of the semiconducting layer 22 that are not covered by the parent superconductor wire 14, thereby forming the one-dimensional hybrid superconductor-semiconductor wire 20 in the semiconducting layer 22.

By applying voltages to the first contact gate 30A and the second contact gate 30B, respective contact regions 34 may be formed on the surface of the semiconductor layer 22. These contact regions 34 may be formed by electrostatically charging the first contact gate 30A and the second contact gate 30B, thereby inducing opposite electrostatic charges on the surface of the semiconductor layer 22 within the contact regions 34. The voltages applied to the first contact gate 30A and the second contact gate 30B may be opposite in sign to the charge on the plunger gate 32. Thus, in the example discussed above in which a negative voltage is applied to the plunger gate 32, positive voltages may be applied to the first contact gate 30A and the second contact gate 30B. Accordingly, a wire segment 36 of the hybrid superconductor-semiconductor wire 20 may be selected. The wire segment 36 is a portion of the hybrid superconductor-semiconductor wire 20 located between the first contact gate 30A and the second contact gate 30B. The wire segment 36 may have a length equal to the length of the plunger gate 32 located between the first contact gate 30A and the second contact gate 30B.

Figure 3:
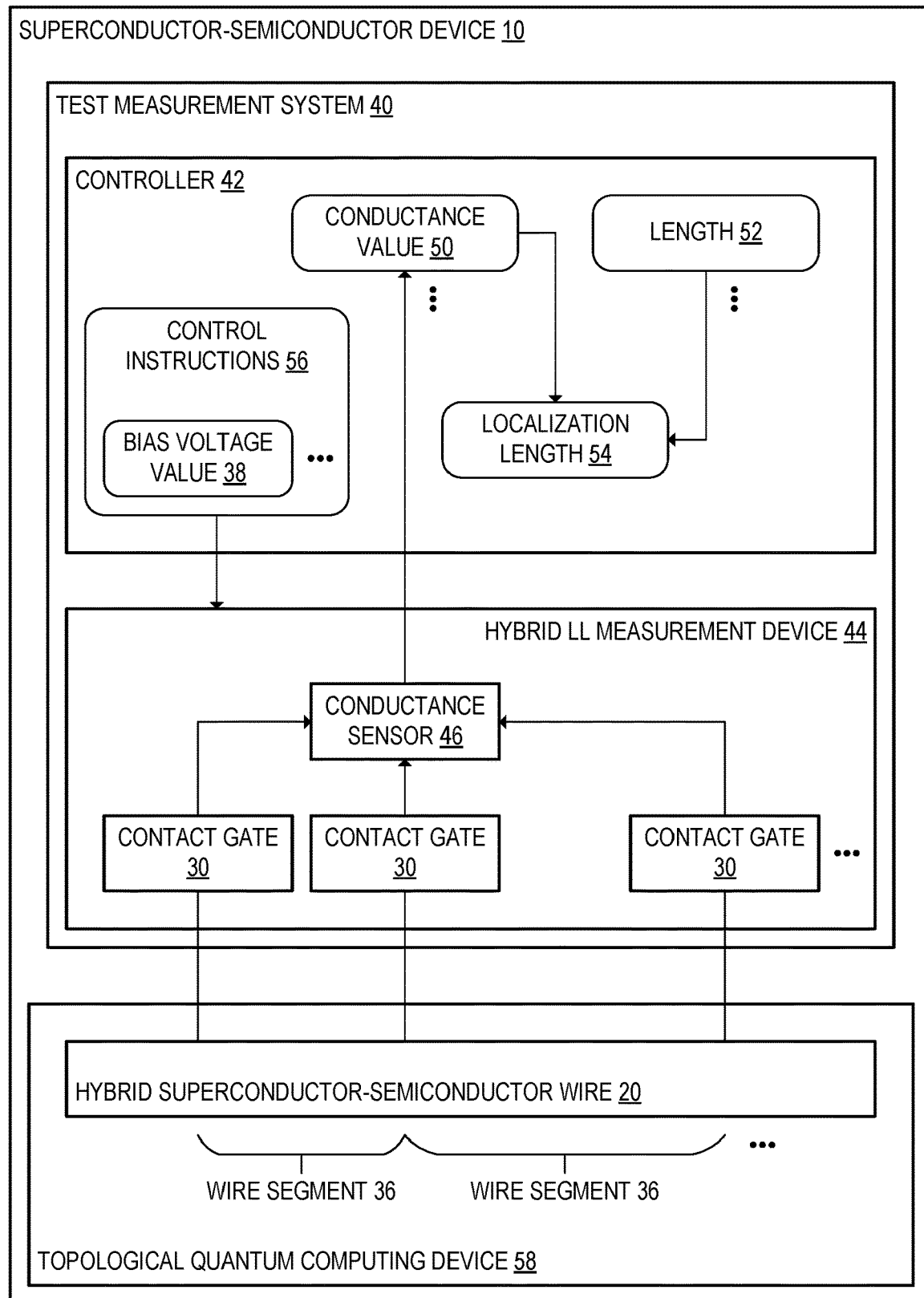
FIG. 3 schematically shows the superconductor-semiconductor device in an example in which the superconductor-semiconductor device includes a test measurement system and a topological quantum computing device, the test measurement system including a controller and a hybrid LL measurement device, according to the example of FIG. 1.

FIG. 3 schematically shows the superconductor-semiconductor device 10 in an example in which the superconductor-semiconductor device 10 includes a test measurement system 40 and a topological quantum computing device 58. In the example of FIG. 3, the hybrid superconductor-semiconductor wire 20 is included in the topological quantum computing device 58, which is coupled to the test measurement system 40 during performance testing. The test measurement system 40 shown in the example of FIG. 3 includes a hybrid LL measurement device 44 configured to measure the LL 54 of the hybrid superconductor-semiconductor wire 20.

The test measurement system 40 further includes a controller 42 configured to generate control instructions 56 that are executed at the hybrid LL measurement device 44. For example, the control instructions 56 may include one or more bias voltage values 38 configured to be applied to the gate electrodes 12 included in the superconductor-semiconductor device 10. In addition, the controller 42 is further configured to process measurement results obtained from the hybrid LL measurement device 44 to compute an LL 54. The controller 42 may, for example, be a classical computing device including a processor and memory.

The controller 42 is configured to control the hybrid LL measurement device 44 to measure a plurality of conductance values 50 of a plurality of wire segments 36 of the hybrid superconductor-semiconductor wire 20. The plurality of wire segments 36 measured by the hybrid LL measurement device 44 have different respective lengths 52. As discussed above, the lengths of the plurality of wire segments 36 may be equal to the lengths of corresponding plunger gates 32 located above those wire segments 36 in the thickness direction 26.

The hybrid LL measurement device 44 shown in FIG. 3 includes a plurality of contact gates 30, which may include the first contact gate 30A and the second contact gate 30B shown in FIG. 2. As shown in the example of FIG. 3, the plurality of contact gates 30 included in the hybrid LL measurement device 44 are each coupled to a conductance sensor 46. The contact gates 30 may be coupled to the conductance sensor 46 via ohmic contacts located far from the hybrid superconductor-semiconductor wire 20 in order to avoid electromagnetic interference between the hybrid superconductor-semiconductor wire 20 and the conductance sensor 46. The conductance sensor 46 is configured to output, to the controller 42, respective conductance values 50 measured at the wire segments 36.

Figure 4A:
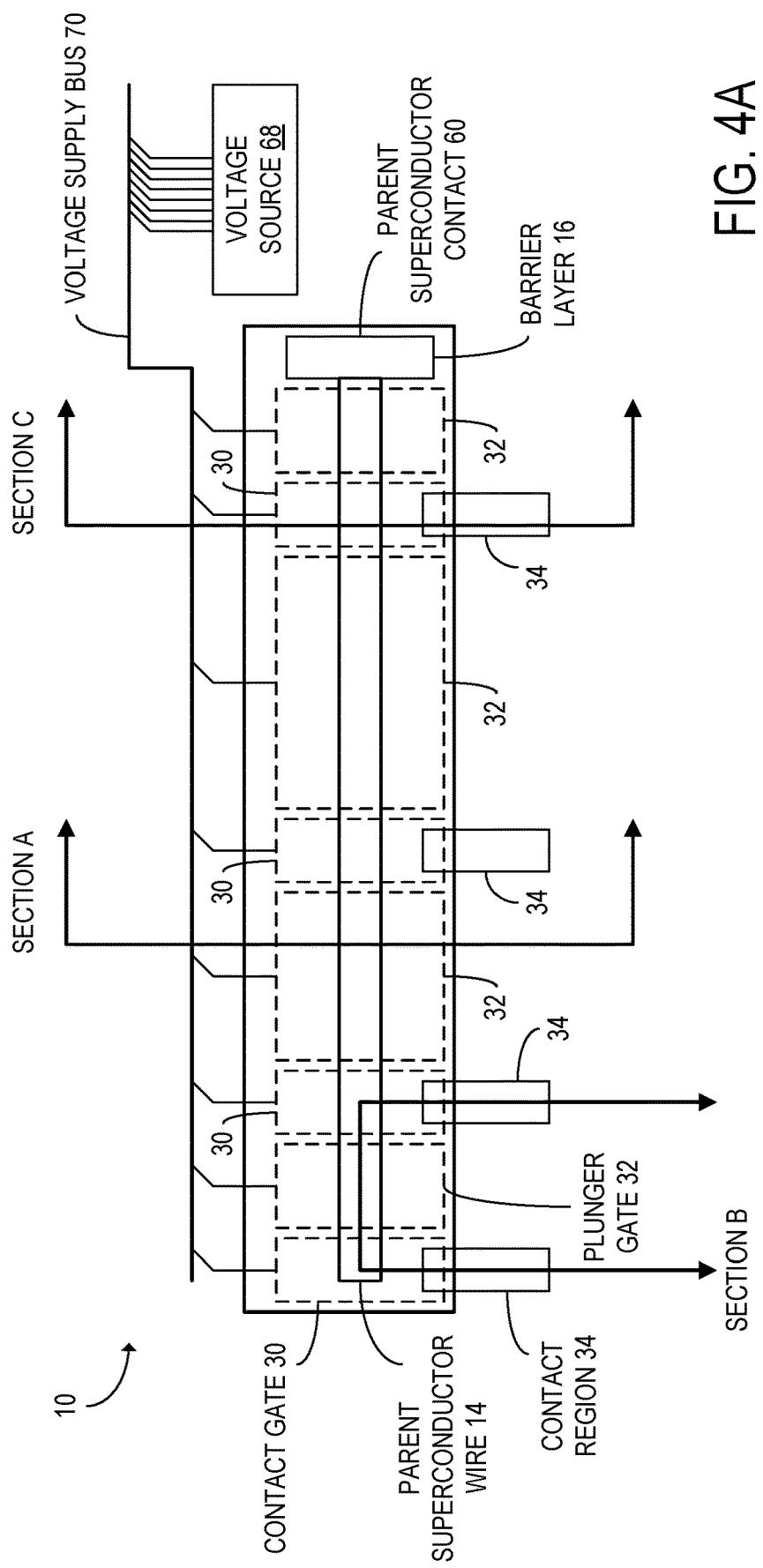
FIG. 4A schematically shows an example top view of the superconductor-semiconductor device, including a plurality of plunger gates and a plurality of contact gates, according to the example of FIG. 2.

FIG. 4A schematically shows an example top view of the superconductor-semiconductor device 10. In the example of FIG. 4A, a plurality of plunger gates 32 with different lengths are located above the parent superconductor wire 14. The superconductor-semiconductor device 10 shown in FIG. 4A further includes a plurality of contact gates 30 located above the parent superconductor wire 14 and interspersed with the plunger gates 32. Thus, the contact gates 30 form wire segments 36 of three different lengths 52 in the example of FIG. 4A. FIG. 4A further shows a voltage source 68 that is coupled to the gate electrodes 12 by a voltage supply bus 70. Via the voltage supply bus 70, the voltage source 68 is configured to concurrently and independently apply respective voltages to the gate electrodes 12.

FIG. 4A further shows a parent superconductor contact 60 located at an end of the parent superconductor wire 14. The parent superconductor contact 60 is configured to act as a superconducting drain via which charge carriers may leave the parent superconductor wire 14 after tunneling into the parent superconductor wire 14. Accordingly, the charge carriers that are removed from the parent superconductor wire 14 via the parent superconductor contact 60 do not contribute to the conductance measurement.

FIG. 4B shows the top view of the superconductor-semiconductor device 10 of FIG. 4A when the voltage source 68 applies respective voltages to the gate electrodes 12 via the voltage supply bus 70. In the example of FIG. 4B, the controller 42 is configured to control the hybrid LL measurement device 44 to apply a first negative voltage 62 to the wire segment 36 via the corresponding plunger gate 32 when the conductance value 50 of the wire segment 36 is measured. The controller 42 may be configured to vary the first negative voltage 62 applied to the wire segment 36 when the conductance value 50 of the wire segment is measured. The first negative voltage 62 may be set to a plurality of different bias voltage values 38 included in the control instructions 56 during the conductance measurement.

When the first negative voltage 62 is applied to the wire segment 36, the parent superconductor wire 14 may at least partially screen the quantum well 18 from the first negative voltage 62 applied via the plunger gate 32. The area of the semiconductor layer 22 that is screened from the first negative voltage 62 is the area of the semiconductor layer 22 at which the hybrid superconductor-semiconductor wire 20 forms. In contrast, portions of the semiconductor layer 22 on each side of the hybrid superconductor-semiconductor wire 20 in the plane of the semiconductor layer 22 may not be screened by the parent superconductor wire 14 from the first negative voltage 62 applied via the plunger gate 32. Screening the area under the parent superconductor wire 14 without screening the other portions of the semiconductor layer 22 allows the charge carriers in the exposed regions of the semiconductor layer 22 to be depleted without depleting the carriers under the parent superconductor wire 14.

The controller 42 may be further configured to control the hybrid LL measurement device 44 to set the first contact gate 30A and the second contact gate 30B to a positive voltage 66 when the conductance value 50 of the wire segment 36 is measured. Thus, by applying the positive voltage 66 to the contact gates 30A and 30B on either side of a wire segment 36, the hybrid LL measurement device 44 is configured to use the contact gates 30A and 30B to select the wire segment 36 at which the conductance measurement is performed. Applying the positive voltage 66 to the first contact gate 30A and the second contact gate 30B allows charge carriers to flow along the hybrid superconductor-semiconductor wire 20 between the first contact gate 30A and the second contact gate 30B.

In the example of FIG. 4B, via the plunger gates 32 located above portions of the hybrid superconductor-semiconductor wire 20 other than the wire segment 36, the controller 42 is configured to control the hybrid LL measurement device 44 to apply a second negative voltage 64 to those portions of the hybrid superconductor-semiconductor wire 20. The magnitude of the second negative voltage 64 may be greater than that of the first negative voltage 62. Accordingly, a tunnel barrier is formed between the plunger gates 32 and the portions of the hybrid superconductor-semiconductor wire 20 other than the wire segment 36, thereby inhibiting the flow of charge carriers in such portions.

By controlling which of the contact gates 30 are used to define the wire segments 36, the controller 42 is configured to control the hybrid LL measurement device 44 to select wire segments 36 that have a plurality of different respective lengths. Thus, the controller 42 may be configured to iteratively select the contact gates 30 that are used as the first contact gate 30A and the second contact gate 30B to define the wire segments 36.

FIG. 4A further shows cross-sections of the superconductor-semiconductor device 10 labeled as Section A, Section B, and Section C. Second A of the superconductor-semiconductor device 10 is shown in FIG. 4C, according to one example. Section A is taken perpendicular to the parent superconductor wire 14. In the example of FIG. 4C, the semiconducting buffer layer 23, the quantum well 18 (including the hybrid superconductor-semiconductor wire 20), the barrier layer 16, the insulating layer 13, the parent superconductor wire 14, and a plunger gate are shown in order from bottom to top in the thickness direction 26. The magnetic field B points to the left in the example of FIG. 4C.

Section B of the superconductor-semiconductor device 10 is shown in FIG. 4D. Section B is taken along the axis of the parent superconductor wire 14. Similarly to Section A, Section B shows the semiconducting buffer layer 23, the hybrid superconductor-semiconductor wire 20, the barrier layer 16, and the insulating layer 13 arranged from bottom to top in the thickness direction 26. FIG. 4D further shows a plunger gate 32 and two contact gates 30 located above the insulating layer 13 in the thickness direction 26. In the example of FIG. 4D, the magnetic field B points into the page.

Figure 4E:
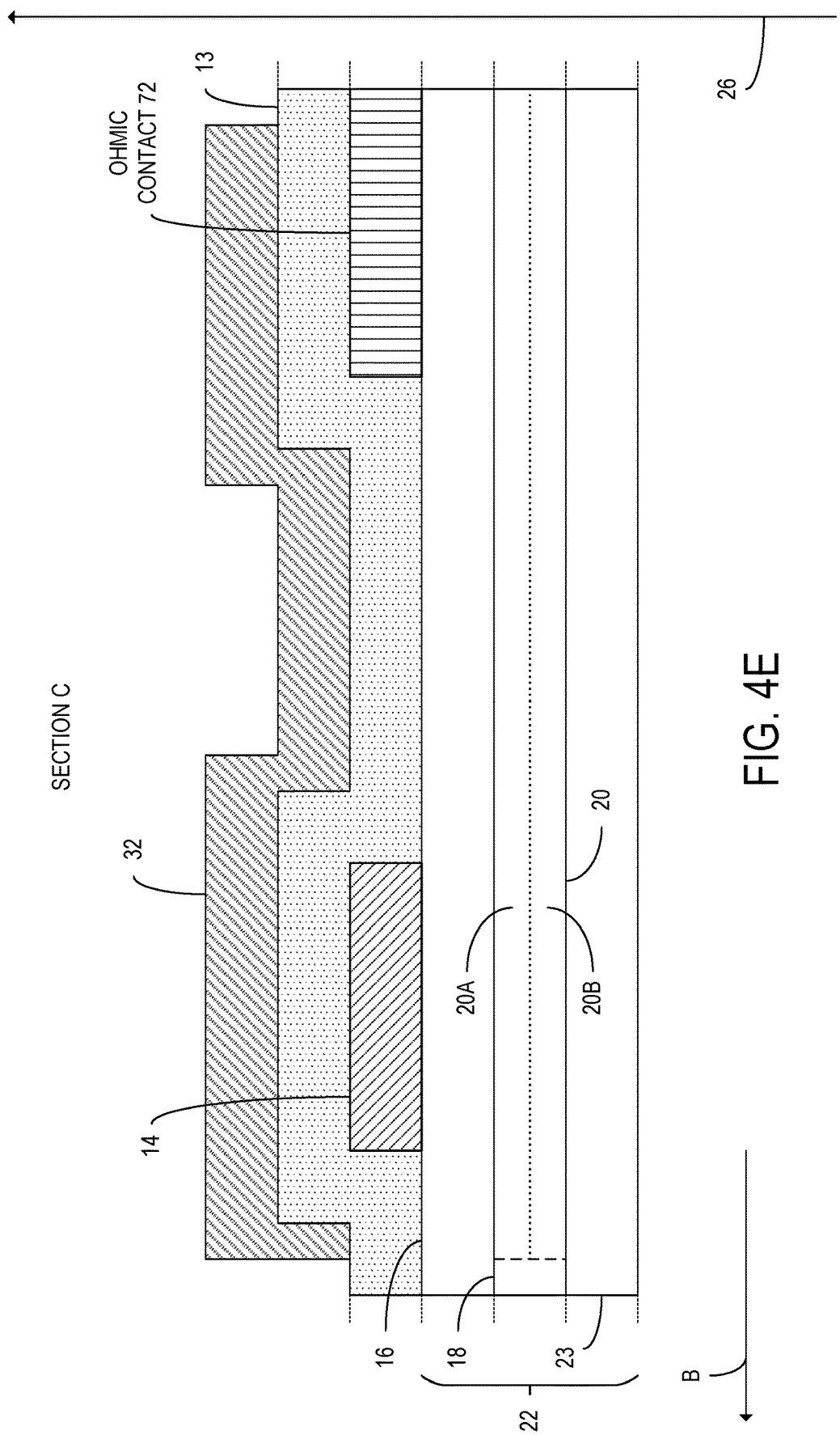

Section C of the superconductor-semiconductor device 10 is shown in FIG. 4E. Section C passes through a contact region 34 and is taken perpendicular to the parent superconductor wire 14. Section C shows the semiconducting buffer layer 23, the quantum well 18, the barrier layer 16, the parent superconductor wire 14, the insulating layer 13, and a plunger gate 32 arranged from bottom to top in the thickness direction 26. Section C further shows an ohmic contact 72 located between the barrier layer 16 and the insulating layer 13. The ohmic contact 72 is located apart from the parent superconductor wire 14 in the plane of the barrier layer 16 in order to avoid electromagnetic interference between the ohmic contact 72 and the parent superconductor wire 14.

Returning to the example of FIG. 3, the controller 42 is further configured to compute an LL 54 of the hybrid superconductor-semiconductor wire 20 based at least in part on the plurality of conductance values 50 and the plurality of lengths 52. Since the conductance values 50, the lengths 52, and the LL 54 of the hybrid superconductor-semiconductor wire 20 approximately satisfy the relation $G \propto \exp(-L/\xi)$, where G is the conductance, the controller 42 may be configured to perform exponential curve-fitting to estimate the LL $\xi$. The scaling factor between G and $\exp(-L/\xi)$ is a device-dependent constant that is affected by the configuration of the superconductor-semiconductor device 10 and by the voltage applied to the hybrid superconductor-semiconductor wire 20. This scaling factor is consistent among wire segments 36 of different lengths 52 included in the same hybrid superconductor-semiconductor wire 20. The LL 54 of the hybrid superconductor-semiconductor wire 20 may be measured as a function of a voltage applied to the gate electrode 12 that controls the potential in the semiconducting wire 20B underneath the superconducting wire 20A, as discussed in further detail below.

Subsequently to estimating the LL 54 of the hybrid superconductor-semiconductor wire 20, the controller 42 is further configured to output the LL 54. The LL 54 may, for example, be output to a quality checking process that is executed to assess the performance of the topological quantum computing device 58. The LL 54 may additionally or alternatively be output for display at a user interface.

The hybrid LL measurement device 44 may enable independent benchmarking of the performance of superconductor-semiconductor devices 10 included in the topological quantum computing device 58. The gate voltage of the gate electrode 12 may also be used to tune to the topological phase of the superconductor-semiconductor device when forming MZMs. Accordingly, the measurement of the LL 54 may utilize components already included in the topological quantum computing device 58 for other purposes, thereby decreasing the size and manufacturing complexity of the hybrid LL measurement device 44.

Accurately measuring the LL 54 of the hybrid superconductor-semiconductor wire 20 presents the following challenges:
1. Isolating a semiconductor contribution to the LL 54 from a superconductor contribution and other extraneous contributions.
2. Efficiently measuring multiple individual wires segments 36, subject to the same processing conditions.

At the hybrid LL measurement device 44, the conductance contribution of the semiconducting wire 20B may be isolated from that of the superconducting wire 20A. The exponential relationship discussed above, according to which the conductance value 50 of a wire scales with the wire length 52 and the LL 54 as $G \propto \exp(-L/\xi)$, also holds for non-local conductance in a hybrid superconductor-semiconductor wire 20 that has a three-terminal (3T) configuration. The above relationship holds for bias voltage values 38 between an induced superconducting (SC) gap and a parent SC gap, since in this bias regime, quasiparticles in the semiconducting wire 20B perform carrier transport. Thus, the LL 54 in the hybrid superconductor-semiconductor wire 20 may be measured by determining the length-dependence of non-local conductance in the above bias range. At bias voltage values 38 below the induced SC gap, no carrier transport occurs (ignoring supercurrent contributions). At bias voltage values 38 above the parent SC gap, carriers are also transported via the parent superconductor wire 14. Thus, in a 3T device, approximately all the current flowing through the hybrid superconductor-semiconductor wire 20 is drained into the superconducting terminal above the parent SC gap.

In order to approximately maximize the bias range over which non-local conductance may be measured, an in-plane magnetic field B may be applied perpendicular to the direction of the hybrid superconductor-semiconductor wire 20 using the magnet 24, as discussed above. In other examples, the in-plane magnetic field B may be applied in a direction parallel to the hybrid superconductor-semiconductor wire 20.

In the hybrid superconductor-semiconductor wire 20, there may be an additional current besides the quasi-particle current through the semiconducting wire 20B. This additional current, referred to as the supercurrent, is a length-independent current through the superconducting wire 20A. Since the presence of this supercurrent would interfere with the measurement of the LL 54, the hybrid LL measurement device 44 is configured to suppress the supercurrent via two approaches. These methods of suppression are based on suppression of Andreev scattering at the superconductor-semiconductor interface within the hybrid superconductor-semiconductor wire 20. First, the supercurrent is suppressed via the magnetic field B, which reduces Andreev reflection. Second, small junctions are used in the components of the superconductor-semiconductor device 10 that operate in high-conductance regimes. In the high-conductance regime, normal transmission through the junctions dominates over Andreev reflection at the junctions, thereby resulting in negligible supercurrent.

Bias voltage values 38 within the range between 0 and the parent superconducting gap (typically several hundred μV) may be used when measuring the non-local conductance values 50. Since the LL 54 depends on the energy of the quasiparticles, the measured LL 54 depends on the bias voltage value 38. Performing the LL measurement at zero bias voltage results in an LL measurement with high accuracy. Alternatively, the conductance may be measured across the range of bias voltage values 38 between 0 and the parent SC gap voltage. The length-scaling of the average conductance over that range may be used to estimate LL. Compared to a measurement of the conductance at a bias voltage value of 0, a measurement of the conductance over the range between 0 and the parent SC gap has reduced noise but slightly overestimates the LL 54.

Figure 5:
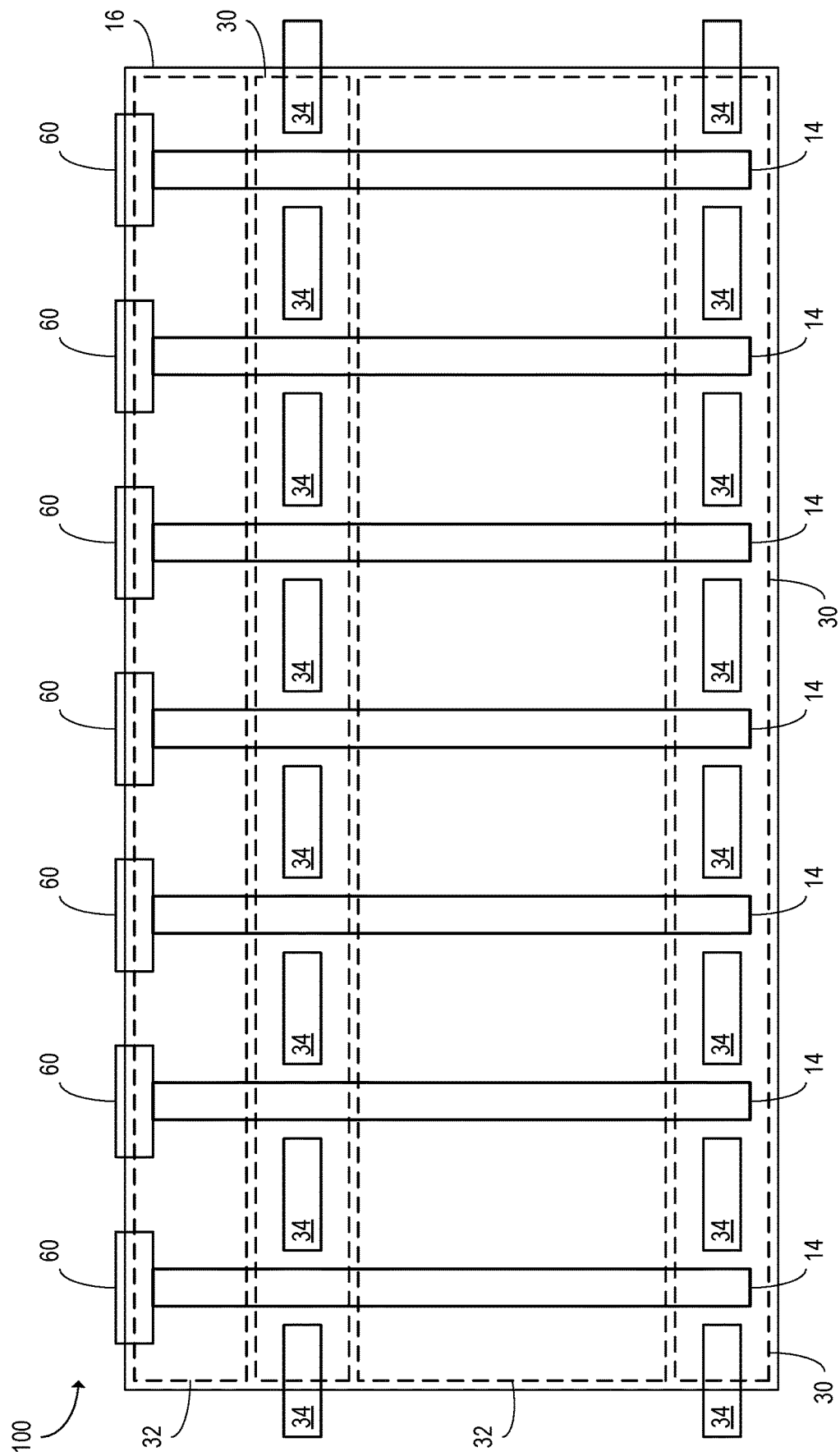
FIG. 5 schematically shows an example top-down view of another superconductor-semiconductor device at which the conductance values of a plurality of wire segments are configured to be measured in parallel, according to the example of FIG. 2.

FIG. 5 schematically shows an example top-down view of another superconductor-semiconductor device 100 at which LL measurement is configured to be performed. In the example of FIG. 5, the controller 42 may be configured to control the hybrid LL measurement device 44 to measure respective conductance values 50 of a plurality of wire segments 36 in parallel. In the configuration of FIG. 5, the plunger gates 32 and the contact gates 30 each extend across a plurality of parent superconductor wires 14 arranged in parallel on the surface of the barrier layer 16. As shown in the example of FIG. 5, the superconductor-semiconductor device 100 includes multiple different lengths of plunger gates 32. Each of those plunger gates 32 forms multiple wire segments 36 under respective portions of the plurality of parent superconductor wires 14. Within the set of wire segments 36 formed using each of the plunger gates 32, charge carriers may be configured to flow between the wire segments 36 included in that set by traveling through the contact gates 30. Accordingly, the hybrid LL measurement device 44 may be configured to measure conductance for a plurality of wire segments 36 collectively.

The selection of the number of wire segments 36, as well as the lengths 52 of those wire segments 36, included in the superconductor-semiconductor device 10 is discussed below. Including wire segments 36 with a wide range of lengths 52 may allow the controller 42 to measure a wide range of LL values. In addition, including a large number of wire segments 36 in the superconductor-semiconductor device 10 may allow the LL measurement to be performed with high fidelity due to having a large sample size. In some examples, the number of wire segments 36 is constrained by a number of electronic control lines included in the controller 42, since the controller 42 is configured to individually control the wire segments 36.

The lengths 52 of the wire segments 36 may be chosen according to the range of potentially measurable values of the LL 54. The endpoints of the LL value range may be indicated as $\xi_{min}$ and $\xi_{max}$. The length 52 of the shortest wire segment 36 may be approximately equal to $\xi_{min}$. The length 52 of the longest wire segment 36 may be chosen such that when the LL 54 is equal to $\xi_{max}$, the expected signal proportional to $e^{-L/\xi_{max}}$ is higher than the noise floor of the conductance sensor 46. Thus, when the LL 54 is equal to $\xi_{max}$, the conductance value 50 is measurable with high probability.

Given the above bounds on the range within which the LL 54 is measured, the lengths 52 of the wire segments 36 may be chosen such that the lengths 52 increase by approximately exponential increments. Accordingly, each wire segment 36 may be longer than a preceding wire segment 36 by approximately a factor of. The value of n may be chosen such that the total number of wire segments 36 is compatible with the available number of electronic control lines included in the controller 42. For example, to measure LLs 54 between approximately 1 μm and 10 μm, wire segments 36 with lengths of 500 nm, 1.3 μm, 2.2 μm, 3 μm, and 4μ m may be used.

Figure 6:
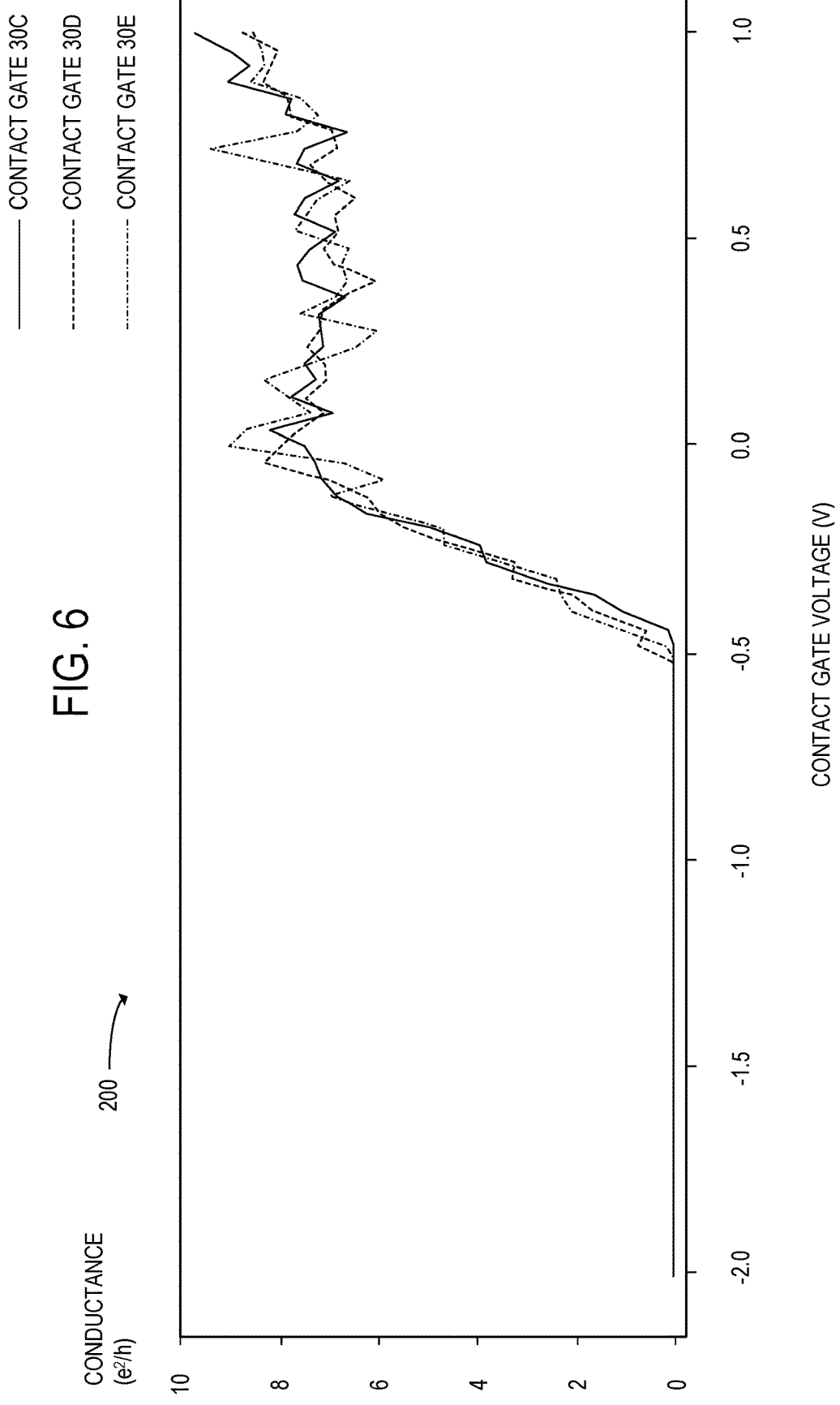
FIG. 6 shows a plot of the conductance of the hybrid superconductor-semiconductor wire as a function of a contact gate voltage, according to the example of FIG. 1.

FIG. 6 shows experimental results that demonstrate uniformity of the conductance values 50 between different contact gates 30 on the same hybrid superconductor-semiconductor wire 20. FIG. 6 shows a conductance plot 200 of the conductance of the hybrid superconductor-semiconductor wire 20 (in units of $e^2/h$) as a function of the contact gate voltage (in units of V). The conductance is plotted for three different contact gates 30C, 30D, and 30E located at different wire segments 36 of the hybrid superconductor-semiconductor wire 20 that have the same length 52. In the example of FIG. 6, the conductance values 50 obtained for the contact gates 30C, 30D, and 30E are averaged over a plurality of bias voltage values 38 that result in charging energies greater than the induced SC gap. The experimental results of FIG. 6 were taken in a regime in which plunger gates 32 are set to highly negative voltages, thereby fully depleting the carriers in the wire segments 36.

As shown in the conductance plot 200 of FIG. 6, the measured conductance values 50 are approximately consistent between the contact gates contact gates 30C, 30D, and 30E as a function of the contact gate voltage when measured at contact gate voltage values above approximately 0 V. In addition, the conductance plot 200 shows that conductance is suppressed at charging energies below the induced SC gap of the parent superconductor wire 14.

Figure 7:
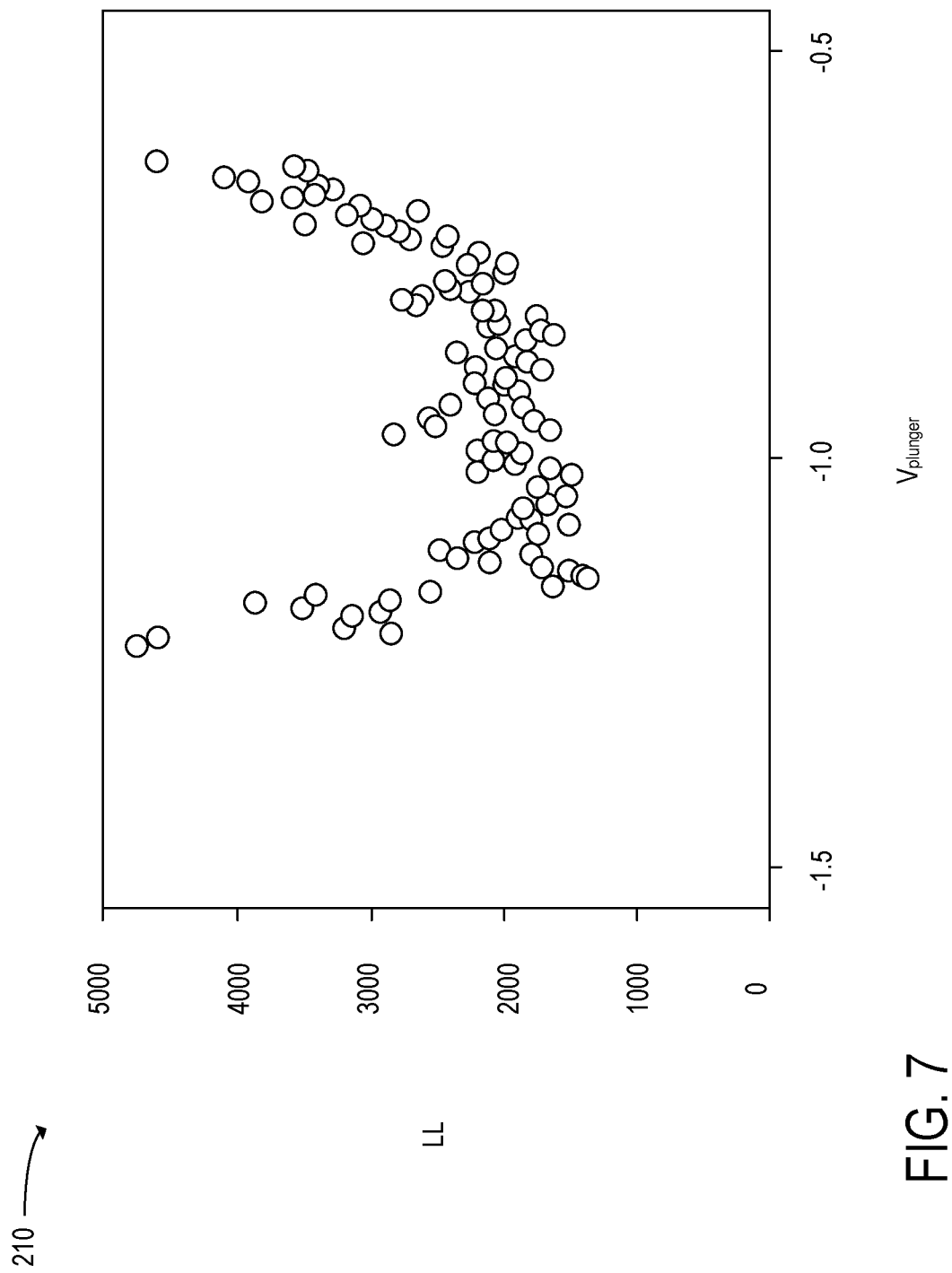
FIG. 7 shows a plot of the LL within a wire segment as a function of the voltage applied to a plunger gate that defines the wire segment, according to the example of FIG. 1.

FIG. 7 shows an LL plot 210 of the LL 54 within a wire segment 36 as a function of the first negative voltage 62 applied to the plunger gate 32 that defines the wire segment 36. In the LL plot 210 of FIG. 7, the LL 54 exhibits a U-shaped curve as a function of the first negative voltage 62. The value that the controller 42 outputs as the LL 54 may be a value of the LL 54 located in the basin of the U-shaped curve. Accordingly, by controlling the hybrid LL measurement device 44 to measure the conductance values 50 over a range of different bias voltage values 38 applied to the plunger gate 32, the controller 42 may be configured to obtain a larger sample of conductance values 50 with which the LL 54 may be estimated.

Figure 8A:
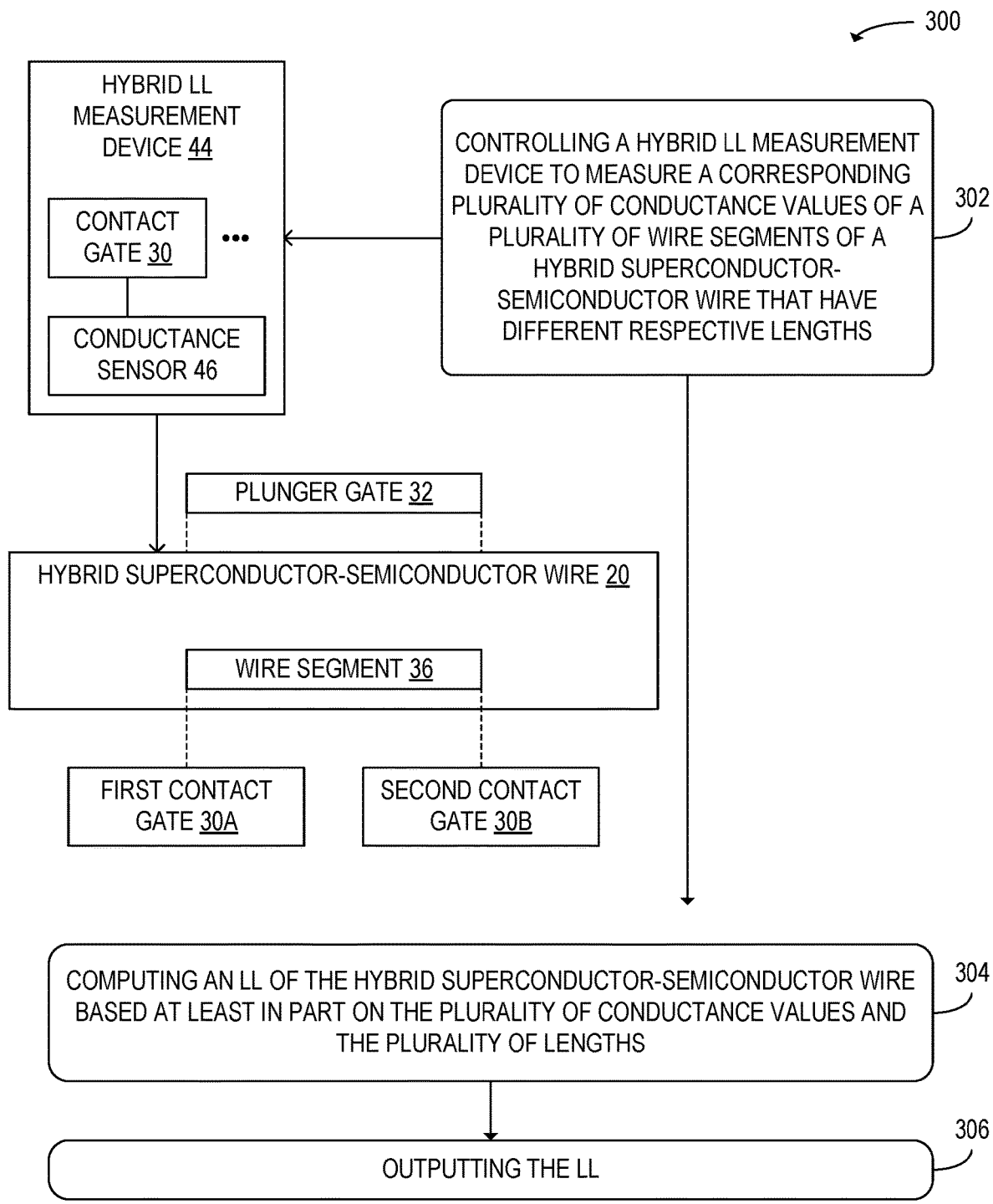
FIG. 8A shows a flowchart of a method for performing an LL measurement at a superconductor-semiconductor device, according to the example of FIG. 1.

FIG. 8A shows a flowchart of a method 300 for use with a superconductor-semiconductor device 10. At step 302, the method 300 may include controlling a hybrid LL measurement device 44 to measure a corresponding plurality of conductance values 50 of a plurality of wire segments 36 of a hybrid superconductor-semiconductor wire 20 that have different respective lengths 52. The hybrid superconductor-semiconductor wire 20 may, for example, be included in a topological quantum computing device 58.

The hybrid LL measurement device 44, which is also shown schematically in the example of FIG. 8A, includes a plurality of contact gates 30 located above the hybrid superconductor-semiconductor wire 20 in a thickness direction 26. The hybrid LL measurement device 44 further includes a conductance sensor 46 electrically coupled to the plurality of contact gates 30. Each of the plurality of wire segments 36 is a portion of the hybrid superconductor-semiconductor wire 20 located between a first contact gate 30A and a second contact gate 30B of the plurality of contact gates 30. In addition to the hybrid superconductor-semiconductor wire 20 and the contact gates 30, the superconductor-semiconductor device 10 at which the method 300 is performed further includes a plurality of plunger gates 32 located above the hybrid superconductor-semiconductor wire 20 in the thickness direction 26. The lengths 52 of the plurality of wire segments 36 are equal to lengths of corresponding plunger gates 32 of the plurality of plunger gates 32.

At step 304, the method 300 further includes computing an LL 54 of the hybrid superconductor-semiconductor wire 20 based at least in part on the plurality of conductance values 50 and the plurality of lengths 52. The LL 54 may be computed via exponential curve fitting using the relationship $G \propto \exp(-L/\xi)$. The proportionality constant between the conductance and the exponential may be dependent on the device geometry and the voltages applied to the gate electrodes 12. At step 306, the method 300 further includes outputting the LL 54.

Figure 8B:
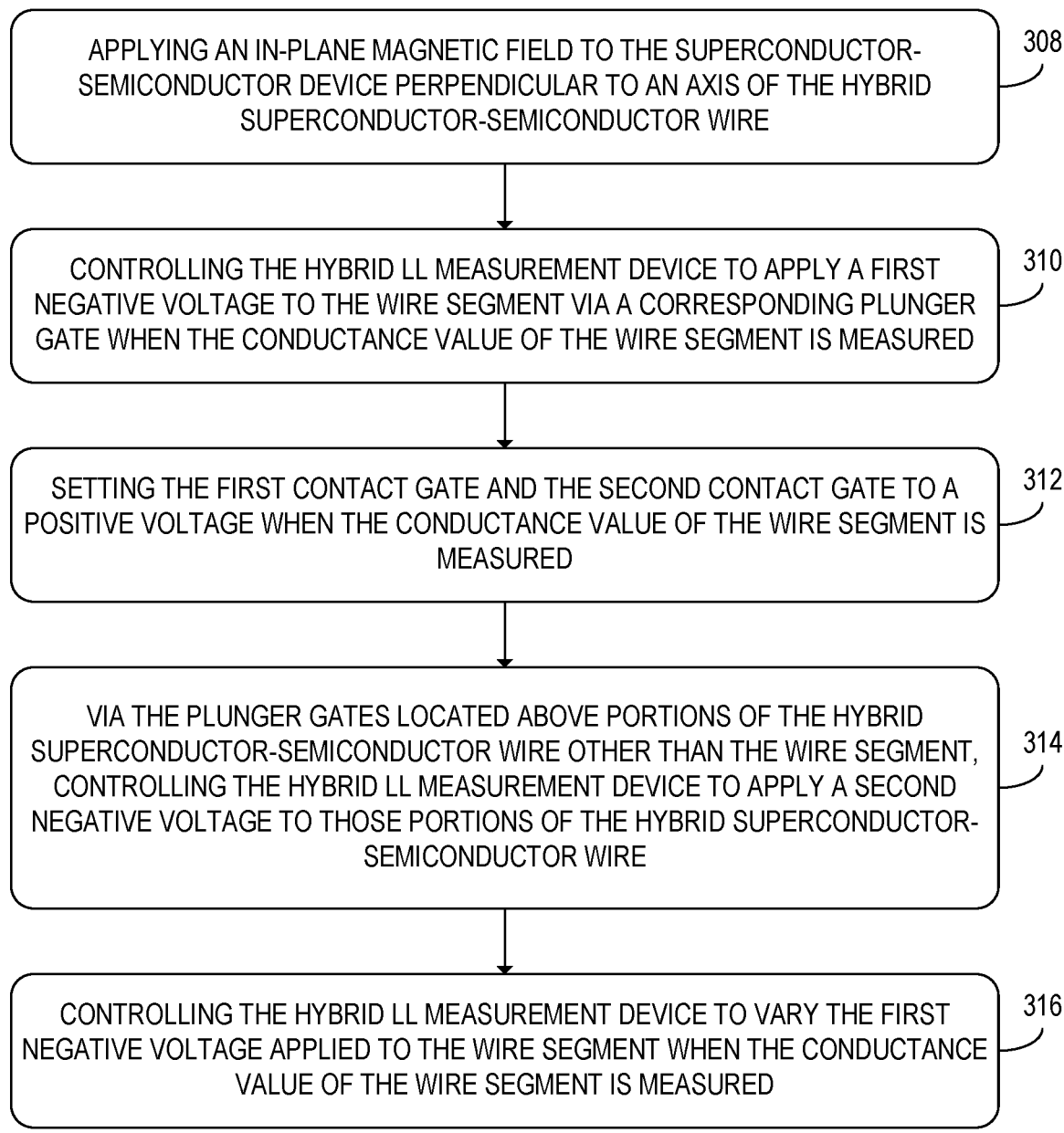
FIG. 8B shows additional steps of the method of FIG. 8A that may be performed when measuring conductance values.

FIG. 8B shows additional steps of the method 300 that may be performed when measuring the conductance values 50 at step 302. At step 308, the method 300 may further include applying an in-plane magnetic field B to the superconductor-semiconductor device 10 perpendicular to an axis of the hybrid superconductor-semiconductor wire 20. The in-plane magnetic field B may be applied using a magnet 24 located below the hybrid superconductor-semiconductor wire 20 in the thickness direction 26. The in-plane magnetic field B may suppress supercurrent and increase the bias voltage range over which conductance measurement may be performed.

At step 310, the method 300 may further include controlling the hybrid LL measurement device 44 to apply a first negative voltage 62 to the wire segment 36 via the corresponding plunger gate 32 when the conductance value 50 of the wire segment 36 is measured. The hybrid LL measurement device 44 may be controlled to set the first negative voltage 62 to a single bias voltage value 38 or to measure the conductance over a range of bias voltage values 38.

At step 312, the method 300 may further include setting the first contact gate 30A and the second contact gate 30B to a positive voltage 66 when the conductance value 50 of the wire segment 36 is measured. Setting the first contact gate 30A and the second contact gate 30B to the positive voltage 66 may allow charge carriers to flow along the wire segment 36 between the first contact gate 30A and the second contact gate 30B.

At step 314, via the plunger gates 32 located above portions of the hybrid superconductor-semiconductor wire 20 other than the wire segment 36, the method 300 may further include controlling the hybrid LL measurement device 44 to apply a second negative voltage 64 to those portions of the hybrid superconductor-semiconductor wire 20. The second negative voltage 64 may be greater in magnitude than the first negative voltage 62. Using the second negative voltage 64, flow of charge carriers in the portions of the hybrid superconductor-semiconductor wire 20 other than the wire segment 36 may be inhibited.

At step 316, the method 300 may further include controlling the hybrid LL measurement device 44 to vary the first negative voltage 62 applied to the wire segment 36 when the conductance value 50 of the wire segment 36 is measured. The first negative voltage 62 may be varied within a range of bias voltage values 38 between 0 V and a parent superconducting gap of the parent superconductor wire 14.

Using the devices and methods discussed above, the LL of a hybrid superconductor-semiconductor wire may be approximated. Such an approximation may be performed when testing components of a topological quantum computing device, such as during a quality checking process performed during manufacturing of the topological quantum computing device. The LL of the hybrid superconductor-semiconductor wire affects its topological coherence length, which may determine whether MZMs are capable of forming at the hybrid superconductor-semiconductor wire. The topological coherence length may also affect eligible ranges of component sizes for some components of the topological quantum computing device. Thus, the LL significantly affects topological quantum computing device performance.

In some embodiments, the methods and processes described herein may be tied to a computing system of one or more computing devices. In particular, such methods and processes may be implemented as a computer-application program or service, an application-programming interface (API), a library, and/or other computer-program product.

Figure 9:
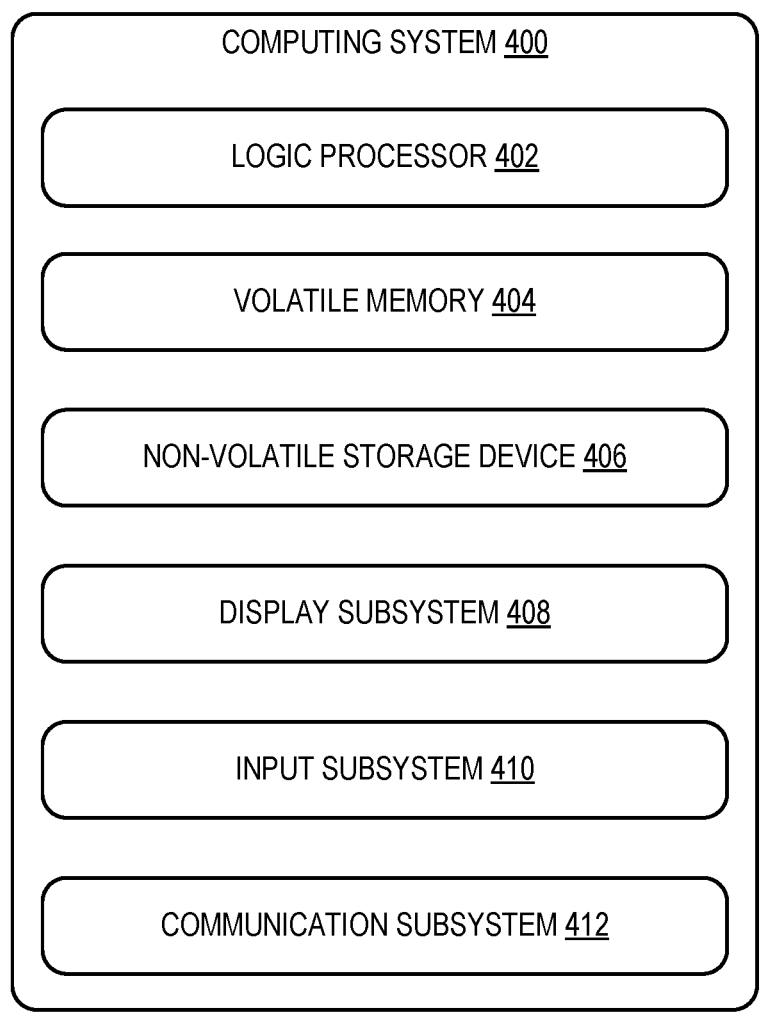
FIG. 9 shows a schematic view of an example computing system in which the controller of FIG. 3 may be instantiated.

FIG. 9 schematically shows a non-limiting embodiment of a computing system 400 that can enact one or more of the methods and processes described above. Computing system 400 is shown in simplified form. Computing system 400 may embody the controller 42 described above and illustrated in FIG. 3. Components of computing system 400 may be included in one or more personal computers, server computers, tablet computers, home-entertainment computers, network computing devices, video game devices, mobile computing devices, mobile communication devices (e.g., smart phone), and/or other computing devices, and wearable computing devices such as smart wristwatches and head mounted augmented reality devices.

Computing system 400 includes a logic processor 402 volatile memory 404, and a non-volatile storage device 406. Computing system 400 may optionally include a display subsystem 408, input subsystem 410, communication subsystem 412, and/or other components not shown in FIG. 9.

Logic processor 402 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors configured to execute software instructions. Additionally or alternatively, the logic processor may include one or more hardware logic circuits or firmware devices configured to execute hardware-implemented logic or firmware instructions. Processors of the logic processor 402 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 406 includes one or more physical devices configured to hold instructions executable by the logic processors to implement the methods and processes described herein. When such methods and processes are implemented, the state of non-volatile storage device 406 may be transformed—e.g., to hold different data.

Non-volatile storage device 406 may include physical devices that are removable and/or built-in. Non-volatile storage device 406 may include optical memory, semiconductor memory, and/or magnetic memory, or other mass storage device technology. Non-volatile storage device 406 may include nonvolatile, dynamic, static, read/write, read-only, sequential-access, location-addressable, file-addressable, and/or content-addressable devices. It will be appreciated that non-volatile storage device 406 is configured to hold instructions even when power is cut to the non-volatile storage device 406.

Volatile memory 404 may include physical devices that include random access memory. Volatile memory 404 is typically utilized by logic processor 402 to temporarily store information during processing of software instructions. It will be appreciated that volatile memory 404 typically does not continue to store instructions when power is cut to the volatile memory 404.

Aspects of logic processor 402, volatile memory 404, and non-volatile storage device 406 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 400 typically implemented in software by a processor to perform a particular function using portions of volatile memory, which function involves transformative processing that specially configures the processor to perform the function. Thus, a module, program, or engine may be instantiated via logic processor 402 executing instructions held by non-volatile storage device 406, using portions of volatile memory 404. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 408 may be used to present a visual representation of data held by non-volatile storage device 406. The visual representation may take the form of a graphical user interface (GUI). As the herein described methods and processes change the data held by the non-volatile storage device, and thus transform the state of the non-volatile storage device, the state of display subsystem 408 may likewise be transformed to visually represent changes in the underlying data. Display subsystem 408 may include one or more display devices utilizing virtually any type of technology. Such display devices may be combined with logic processor 402, volatile memory 404, and/or non-volatile storage device 406 in a shared enclosure, or such display devices may be peripheral display devices.

When included, input subsystem 410 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 412 may be configured to communicatively couple various computing devices described herein with each other, and with other devices. Communication subsystem 412 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 400 to send and/or receive messages to and/or from other devices via a network such as the Internet.

The following paragraphs discuss several aspects of the present disclosure. According to one aspect of the present disclosure, a superconductor-semiconductor device is provided, including a hybrid superconductor-semiconductor wire. The superconductor-semiconductor device further includes a hybrid localization length (LL) measurement device including a plurality of contact gates located above the hybrid superconductor-semiconductor wire in a thickness direction. The hybrid LL measurement device further includes a conductance sensor electrically coupled to the plurality of contact gates. The above features may have the technical effect of allowing conductance measurements to be performed to thereby estimate the LL of the hybrid superconductor-semiconductor wire.

According to this aspect, the superconductor-semiconductor device may further include a controller configured to control the hybrid LL measurement device to measure a corresponding plurality of conductance values of a plurality of wire segments of the hybrid superconductor-semiconductor wire that have different respective lengths. Each of the plurality of wire segments may be a portion of the hybrid superconductor-semiconductor wire located between a first contact gate and a second contact gate of the plurality of contact gates. The controller may be further configured to compute an LL of the hybrid superconductor-semiconductor wire based at least in part on the plurality of conductance values and the plurality of lengths. The controller may be further configured to output the LL. The above features may have the technical effect of performing conductance measurements of the wire segments and determining the LL of the hybrid superconductor-semiconductor wire based on the results of those measurements.

According to this aspect, the superconductor-semiconductor device may further include a plurality of plunger gates located above the hybrid superconductor-semiconductor wire in the thickness direction, wherein the lengths of the plurality of wire segments are equal to lengths of corresponding plunger gates of the plurality of plunger gates. The above features may have the technical effect of providing a structure with which voltages may be applied to components of the superconductor-semiconductor device.

According to this aspect, the controller is further configured to control the hybrid LL measurement device to apply a first negative voltage to the wire segment via the corresponding plunger gate when the conductance value of the wire segment is measured. The above features may have the technical effect of forming the hybrid superconductor-semiconductor wire under a parent superconductor wire.

According to this aspect, the first contact gate and the second contact gate may be set to a positive voltage when the conductance value of the wire segment is measured. The above features may have the technical effect of allowing charge carriers to flow along the hybrid superconductor-semiconductor wire.

According to this aspect, via the plunger gates located above portions of the hybrid superconductor-semiconductor wire other than the wire segment, the controller may be configured to control the hybrid LL measurement device to apply a second negative voltage to those portions of the hybrid superconductor-semiconductor wire. The above features may have the technical effect of inhibiting the flow of charge carriers in the portions of the hybrid superconductor-semiconductor wire other than the wire segment.

According to this aspect, the controller may be further configured to control the hybrid LL measurement device to vary the first negative voltage applied to the wire segment when the conductance value of the wire segment is measured. The above features may have the technical effect of obtaining multiple measurements of the conductance of the wire segment, thereby allowing more precise estimation of the LL.

According to this aspect, the hybrid superconductor-semiconductor wire may be located in a quantum well. The quantum well may be located in a semiconductor layer of the superconductor-semiconductor device. The above features may have the technical effect of forming the hybrid superconductor-semiconductor wire in a 2DEG.

According to this aspect, the superconductor-semiconductor device may further include a parent superconductor wire located above and parallel to the hybrid superconductor-semiconductor wire in the thickness direction. The superconductor-semiconductor device may further include a barrier layer located between the parent superconductor wire and the quantum well in the thickness direction. The above features may have the technical effect of forming the hybrid superconductor-semiconductor wire via screening of a portion of the quantum well by the parent superconductor wire.

According to this aspect, the parent superconductor wire may at least partially screen the quantum well from the first negative voltage applied via the plunger gate. The above features may have the technical effect of forming the hybrid superconductor-semiconductor wire via screening of a portion of the quantum well by the parent superconductor wire.

According to this aspect, portions of the semiconductor layer on each side of the hybrid superconductor-semiconductor wire in a plane of the semiconductor layer may not be screened by the parent superconductor wire from the first negative voltage applied via the plunger gate. The above features may have the technical effect of forming an approximately one-dimensional hybrid superconductor-semiconductor wire.

According to this aspect, the superconductor-semiconductor device may further include a magnet configured to produce an in-plane magnetic field perpendicular to an axis of the hybrid superconductor-semiconductor wire. The above features may have the technical effect of suppressing supercurrent at the superconductor-semiconductor interface within the hybrid superconductor-semiconductor wire.

According to this aspect, the hybrid superconductor-semiconductor wire may be included in a topological quantum computing device. The above features may have the technical effect of providing a structure at which Majorana zero modes may form within the topological quantum computing device.

According to another aspect of the present disclosure, a method for use with a superconductor-semiconductor device is provided. The method includes controlling a hybrid LL measurement device to measure a corresponding plurality of conductance values of a plurality of wire segments of a hybrid superconductor-semiconductor wire that have different respective lengths. The hybrid LL measurement device includes a plurality of contact gates located above the hybrid superconductor-semiconductor wire in a thickness direction. The hybrid LL measurement device further includes a conductance sensor electrically coupled to the plurality of contact gates. Each of the plurality of wire segments is a portion of the hybrid superconductor-semiconductor wire located between a first contact gate and a second contact gate of the plurality of contact gates. The method further includes computing an LL of the hybrid superconductor-semiconductor wire based at least in part on the plurality of conductance values and the plurality of lengths. The method further includes outputting the LL. The above features may have the technical effect of performing conductance measurements of the wire segments and determining the LL of the hybrid superconductor-semiconductor wire based on the results of those measurements.

According to this aspect, the superconductor-semiconductor device may further include a plurality of plunger gates located above the hybrid superconductor-semiconductor wire in the thickness direction. The lengths of the plurality of wire segments may be equal to lengths of corresponding plunger gates of the plurality of plunger gates. The above features may have the technical effect of providing a structure with which voltages may be applied to components of the superconductor-semiconductor device.

According to this aspect, the method may further include controlling the hybrid LL measurement device to apply a first negative voltage to the wire segment via the corresponding plunger gate when the conductance value of the wire segment is measured. The above features may have the technical effect of forming the hybrid superconductor-semiconductor wire under a parent superconductor wire.

According to this aspect, the method may further include setting the first contact gate and the second contact gate to a positive voltage when the conductance value of the wire segment is measured. The method may further include, via the plunger gates located above portions of the hybrid superconductor-semiconductor wire other than the wire segment, controlling the hybrid LL measurement device to apply a second negative voltage to those portions of the hybrid superconductor-semiconductor wire. The above features may have the technical effect of allowing charge carriers to flow along the hybrid superconductor-semiconductor wire while inhibiting the flow of charge carriers in the portions of the hybrid superconductor-semiconductor wire other than the wire segment.

According to this aspect, the method may further include controlling the hybrid LL measurement device to vary the first negative voltage applied to the wire segment when the conductance value of the wire segment is measured. The above features may have the technical effect of obtaining multiple measurements of the conductance of the wire segment, thereby allowing more precise estimation of the LL.

According to this aspect, the method may further include applying an in-plane magnetic field to the superconductor-semiconductor device perpendicular to an axis of the hybrid superconductor-semiconductor wire. The above features may have the technical effect of suppressing supercurrent at the superconductor-semiconductor interface within the hybrid superconductor-semiconductor wire.

According to another aspect of the present disclosure, a superconductor-semiconductor device is provided, including a hybrid superconductor-semiconductor wire located in a quantum well included in a semiconductor layer of the superconductor-semiconductor device. The superconductor-semiconductor device further includes a barrier layer located above the semiconductor layer in the thickness direction. The superconductor-semiconductor device further includes a parent superconductor wire located above the barrier layer in the thickness direction and parallel to the hybrid superconductor-semiconductor wire. The superconductor-semiconductor device further includes a hybrid localization length (LL) measurement device including a plurality of gate electrodes located above the parent superconductor wire in a thickness direction. The plurality of gate electrodes includes a plurality of contact gates and a plurality of plunger gates. The hybrid LL measurement device further includes a conductance sensor electrically coupled to the plurality of contact gates. The hybrid LL measurement device is further configured to measure a corresponding plurality of conductance values of a plurality of wire segments of the hybrid superconductor-semiconductor wire that have different respective lengths. The lengths of the plurality of wire segments are equal to lengths of corresponding plunger gates of the plurality of plunger gates. The above features may have the technical effect of performing conductance measurements of the wire segments and determining the LL of the hybrid superconductor-semiconductor wire based on the results of those measurements.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A superconductor-semiconductor device comprising:
a hybrid superconductor-semiconductor wire; and
a hybrid localization length (LL) measurement device including:
   a plurality of contact gates located above the hybrid superconductor-semiconductor wire in a thickness direction; and
   a conductance sensor electrically coupled to the plurality of contact gates.

2. The superconductor-semiconductor device of claim 1, further comprising a controller configured to:
control the hybrid LL measurement device to measure a corresponding plurality of conductance values of a plurality of wire segments of the hybrid superconductor-semiconductor wire that have different respective lengths, wherein each of the plurality of wire segments is a portion of the hybrid superconductor-semiconductor wire located between a first contact gate and a second contact gate of the plurality of contact gates;
compute an LL of the hybrid superconductor-semiconductor wire based at least in part on the plurality of conductance values and the plurality of lengths; and
output the LL.

3. The superconductor-semiconductor device of claim 2, further comprising a plurality of plunger gates located above the hybrid superconductor-semiconductor wire in the thickness direction, wherein the lengths of the plurality of wire segments are equal to lengths of corresponding plunger gates of the plurality of plunger gates.

4. The superconductor-semiconductor device of claim 3, wherein the controller is further configured to control the hybrid LL measurement device to apply a first negative voltage to the wire segment via the corresponding plunger gate when the conductance value of the wire segment is measured.

5. The superconductor-semiconductor device of claim 4, wherein the first contact gate and the second contact gate are set to a positive voltage when the conductance value of the wire segment is measured.

6. The superconductor-semiconductor device of claim 5, wherein, via the plunger gates located above portions of the hybrid superconductor-semiconductor wire other than the wire segment, the controller is configured to control the hybrid LL measurement device to apply a second negative voltage to those portions of the hybrid superconductor-semiconductor wire.

7. The superconductor-semiconductor device of claim 4, wherein the controller is further configured to control the hybrid LL measurement device to vary the first negative voltage applied to the wire segment when the conductance value of the wire segment is measured.

8. The superconductor-semiconductor device of claim 4, wherein:
the hybrid superconductor-semiconductor wire is located in a quantum well; and
the quantum well is located in a semiconductor layer of the superconductor-semiconductor device.

9. The superconductor-semiconductor device of claim 8, further comprising:
a parent superconductor wire located above and parallel to the hybrid superconductor-semiconductor wire in the thickness direction; and
a barrier layer located between the parent superconductor wire and the quantum well in the thickness direction.

10. The superconductor-semiconductor device of claim 9, wherein the parent superconductor wire at least partially screens the quantum well from the first negative voltage applied via the plunger gate.

11. The superconductor-semiconductor device of claim 10, wherein portions of the semiconductor layer on each side of the hybrid superconductor-semiconductor wire in a plane of the semiconductor layer are not screened by the parent superconductor wire from the first negative voltage applied via the plunger gate.

12. The superconductor-semiconductor device of claim 1, further comprising a magnet configured to produce an in-plane magnetic field perpendicular to an axis of the hybrid superconductor-semiconductor wire.

13. The superconductor-semiconductor device of claim 1, wherein the hybrid superconductor-semiconductor wire is included in a topological quantum computing device.

14. A method for use with a superconductor-semiconductor device, the method comprising:
controlling a hybrid localization length (LL) measurement device to measure a corresponding plurality of conductance values of a plurality of wire segments of a hybrid superconductor-semiconductor wire that have different respective lengths, wherein:
the hybrid LL measurement device includes:
   a plurality of contact gates located above the hybrid superconductor-semiconductor wire in a thickness direction; and
   a conductance sensor electrically coupled to the plurality of contact gates; and
each of the plurality of wire segments is a portion of the hybrid superconductor-semiconductor wire located between a first contact gate and a second contact gate of the plurality of contact gates;
computing an LL of the hybrid superconductor-semiconductor wire based at least in part on the plurality of conductance values and the plurality of lengths; and
outputting the LL.

15. The method of claim 14, wherein:
the superconductor-semiconductor device further includes a plurality of plunger gates located above the hybrid superconductor-semiconductor wire in the thickness direction; and
the lengths of the plurality of wire segments are equal to lengths of corresponding plunger gates of the plurality of plunger gates.

16. The method of claim 15, further comprising controlling the hybrid LL measurement device to apply a first negative voltage to the wire segment via the corresponding plunger gate when the conductance value of the wire segment is measured.

17. The method of claim 16, further comprising:
setting the first contact gate and the second contact gate to a positive voltage when the conductance value of the wire segment is measured; and
via the plunger gates located above portions of the hybrid superconductor-semiconductor wire other than the wire segment, controlling the hybrid LL measurement device to apply a second negative voltage to those portions of the hybrid superconductor-semiconductor wire.

18. The method of claim 16, further comprising controlling the hybrid LL measurement device to vary the first negative voltage applied to the wire segment when the conductance value of the wire segment is measured.

19. The method of claim 14, further comprising applying an in-plane magnetic field to the superconductor-semiconductor device perpendicular to an axis of the hybrid superconductor-semiconductor wire.

20. A superconductor-semiconductor device comprising:
a hybrid superconductor-semiconductor wire located in a quantum well included in a semiconductor layer of the superconductor-semiconductor device;
a barrier layer located above the semiconductor layer in a thickness direction;
a parent superconductor wire located above the barrier layer in the thickness direction and parallel to the hybrid superconductor-semiconductor wire;
a hybrid localization length (LL) measurement device including:
  a plurality of gate electrodes located above the parent superconductor wire in a thickness direction, wherein the plurality of gate electrodes includes a plurality of contact gates and a plurality of plunger gates; and
  a conductance sensor electrically coupled to the plurality of contact gates, wherein:
the hybrid LL measurement device is configured to measure a corresponding plurality of conductance values of a plurality of wire segments of the hybrid superconductor-semiconductor wire that have different respective lengths; and
the lengths of the plurality of wire segments are equal to lengths of corresponding plunger gates of the plurality of plunger gates.

* * * * *